United States Patent [19]

Allen

[11] 4,104,335

[45] Aug. 1, 1978

[54] DUSTLESS, FREE-FLOWING ULTRAVIOLET ABSORBING COMPOSITIONS FOR POLYOLEFINS

[75] Inventor: Leigh Cameron Allen, Bound Brook, N.J.

[73] Assignee: American Cyanamid Company, Stamford, Conn.

[21] Appl. No.: 719,796

[22] Filed: Sep. 2, 1976

[51] Int. Cl.² .............................................. C08K 5/36
[52] U.S. Cl. ................................ 260/897 A; 252/402; 260/45.75 N; 260/896
[58] Field of Search .................... 260/45.75 N, 897 A, 260/896, 42.56; 252/402 R, 405

[56] References Cited

U.S. PATENT DOCUMENTS

| 3,215,717 | 11/1965 | Foster | 260/45.75 N |
| 3,755,247 | 8/1973 | Mathis et al. | 260/45.75 N |
| 3,925,308 | 12/1975 | Jancis | 260/45.75 N |

*Primary Examiner*—V. P. Hoke
*Attorney, Agent, or Firm*—Philip Mintz; F. M. Van Riet

[57] ABSTRACT

Dustless, free-flowing ultraviolet absorbing compositions for use in polyolefins comprise an intimate mixture of a major proportion of a nickel amine complex of a 2,2'-thiobis(4-alkylphenol) and a minor proportion of a low molecular weight polyethylene.

7 Claims, No Drawings

DUSTLESS, FREE-FLOWING ULTRAVIOLET ABSORBING COMPOSITIONS FOR POLYOLEFINS

BACKGROUND OF THE INVENTION

This invention relates to dustless, free-flowing ultraviolet absorbing compositions for use in polyolefins. More particularly this invention relates to dustless nickel amine complexes of 2,2'-thiobis(4-alkylphenols) containing an effective amount of a low molecular weight polyethylene.

As is well-known, polyolefins are subject to degradation on prolonged exposure to ultraviolet light. It is also well-known that polyolefins can be stabilized against the deteriorative effects of ultraviolet light by incorporating therein a nickel amine complex of a 2,2'-thiobis(4-alkylphenol), as disclosed by Foster in U.S. Pat. Nos. 3,215,717 and 3,313,770 and Stretanski and Hoffman in U.S. Pat. No. 3,816,492. The nickel n-butylamine complex of 2,2'-thiobis(4-t -octylphenol), described in Example 8 of said Foster patents, is a commercially available member of this class of stabilizers.

The nickel amine complexes of 2,2'-thiobis(4-alkylphenol), particularly the nickel n-butylamine complex, tend inherently to be very dusty, consequently contaminating the working area with nickel and creating a hazard for workers.

The stabilizing value of these ultraviolet absorbing compounds is so great that they are widely used despite the serious dusting problem. Various attempts have been made in the past to overcome these difficulties, but such have not been completely successful and difficulties are still present. In some instances, where attempts have been made to overcome dustiness by incorporating therein small amounts of a mineral oil or plasticizer, the products were found to be sticky, not free-flowing, and to tend to cake. This makes the material difficult to process.

Thus, there is a need for dustless nickel amine complexes of 2,2'-thiobis(4-alkylphenols) which are also free-flowing and non-sticky, and which can be easily and uniformly incorporated in polyolefins by conventional blending means.

SUMMARY OF THE INVENTION

I have now discovered that essentially dustless, free-flowing, non-sticky ultraviolet absorbing compositions, useful for the ultraviolet light stabilization of polyolefins, particularly polypropylene, are formed when a nickel amine complex of a 2,2'-thiobis(4-alkylphenol) and a minor amount of about 1% to 10% by weight thereof of a low molecular weight polyethylene are intimately mixed.

Preferably, the compositions comprise a nickel alkylamine complex of 2,2'-thiobis(4-t-octylphenol) and about 1% to 10% by weight thereof of low molecular weight polyethylene.

Still more preferably, the compositions comprise the nickel n-butylamine complex of 2,2'-thiobis(4-t-octylphenol) and about 1% to 10% by weight of a low molecular weight polyethylene.

The dustless compositions of this invention have the following advantages of:

1. Improved dispersability and processability,
2. Significant reduction in the hazard due to air-borne dust pollution during processing, and
3. Reduction in losses of material due to dusting.

The compositions of the invention are intimate mixtures of a nickel amine complex of a 2,2'-thiobis(4-alkylphenol) and a minor, though effective, amount of a low molecular weight polyethylene.

The nickel amine complexes, processes for their preparation, and their uses, are described in detail by Foster and Stretanski and Hoffman in the aforementioned U.S. patents, the disclosures of which are expressly incorporated herein by reference. Of particular importance commercially is the nickel n-butylamine complex of 2,2'-thiobis(4-t-octylphenol).

The low molecular weight polyethylene which is initmately admixed with the nickel amine complexes to provide the essentially dustless compositions of the invention may include homopolymers of ethylene as well as copolymers of ethylene with a minor amount of vinyl acetate or propylene. In general, low molecular weight polyethylene has a molecular weight in the range of about 500 to 5,000. Representative of such low molecular weight polyethylene if Allied Chemical Corporation grade AC-405, which has a softening point of 96° C., a density of 0.91 grams per cubic centimeter, and a Brookfield viscosity of 230 centipoises at 140° C.

While it is desirable for obvious reasons to use as little of the low molecular weight polyethylene as is necessary to achieve an essentially dustless nickel amine complex, it is ordinarily possible to achieve this state with an effective amount of from about 1 to 10 percent by weight based on the weight of the nickel complex. The nickel n-butyl-amine complex of 2,2'-thiobis(4-t-octylphenol) can be rendered essentially dustless by incorporation therein of about 1 percent by weight of low molecular weight polyethylene.

The compositions are prepared preferably by adding the low molecular weight polyethylene to a solution of the nickel amine complex in a suitable solvent, such as toluene, benzene, chloroform, and the like, and recovering the dustless product therefrom by evaporation of the solvent. Another method involves simply mixing the two components in the appropriate proportions and heating the mixture to the melting point of the polymer while mixing.

The dustless compositions may be incorporated into the polyolefins to be stabilized against degradation by ultraviolet radiation by the same conventional means described by Foster, namely by milling, tumbling, Banbury mixing, and the like.

The invention and some of its advantages are illustrated by the following examples, in which all parts are by weight. Dustiness by its nature is a subjective phenomenon, not readily quantified. Nevertheless, I have devised a semiquantitative procedure for its comparative evaluation. Thus, the compositions are shaken in a closed glass container for a few seconds, the cap is removed and the degree of dustiness given a rating on a scale of 1-10, wherein 1 indicates little or no dust is evident and 10 indicates severe dustiness. Ratings between 1 and 10 are assessed depending on the length of time after shaking for the dust to settle.

Stickiness is evaluated by a similar method whereby the composition is shaken in a closed glass container for a few seconds and then noting the extent of deposit of the composition on the container walls; 1 indicates no deposit and 10 indicates a heavy deposit.

Flowability or Melt Flow Characteristics are measured in accordance with ASTM D-1238, Condition L.

Dispersibility in the polymer substrate is determined by milling the composition into low density polyethylene and molding the composition into thin films. Microscopic examination of the films from range of particle size gives a measure of the dispersibility of the composition.

EXAMPLE 1

A mixture of 75 parts of toluene, 58.7 parts of 2,2'-thiobis(4-t-octylphenol), 19.7 parts of n-butylamine, and 34.5 parts of nickel sulfate is heated to 60° C and a solution of 15 parts of 50% sodium hydroxide in 24 parts of water is added thereto. The resulting two-phase mixture is stirred at 75° C for 2 hours and allowed to settle. The aqueous layer is separated and 0.7 part of low molecular weight polyethylene (Allied Chemical, AC-405) is added to the remaining toluene solution. The toluene solution is dehydrated by distillation and then clarified. At 55° C, 150 parts of methanol is added to the toluene solution to precipitate the product as a slurry. The slurry is cooled to 0° C, filtered, washed with methanol and dried at 120° C. The yield is 70 parts of the nickel n-butylamine complex of 2,2'-thiobis(4-t-octylphenol) containing 1% by weight of polyethylene.

EXAMPLE 2

The procedure of Example 1 is followed except that the step of adding the low molecular weight polyethylene is omitted. The nickel n-butylamine complex of 2,2'-thiobis(4-t-octylphenol) obtained thereby is blended with low molecular weight polyethylene at a level of 10% by weight of said polyethylene by heating to melt the polymer while agitating the mixture.

EXAMPLE 3

Evaluation of Dustness of the Compositions

A sample of the product of Example 1 was placed in a small glass jar, the jar was capped and vigorously shaken for a few seconds and dustiness evaluated in accordance with the test described hereinabove. The sample showed a very slight amount of dust in the upper portion of the jar, which rapidly settled—a rating of about 2 on a scale of 1 to 10. A similar test was conducted using an untreated sample of the nickel complex. An extensive amount of dust was apparent on removing the cap from the jar. The dust required considerable time to settle. The sample is rated 9–10 on the aforementioned scale.

The treated sample did not adhere to the walls of the jar after shaking, which illustrates the free-flowing nature of the composition.

EXAMPLE 4

Evaluation of Melt Flow Characteristics

A sample of the composition of Example 1 was incorporated into unstabilized polypropylene (Profax 6401Hercules) at a level of 1 percent by weight, along with 0.1 percent by weight of 2,6-di-tert.butyl-4-methylphenol, by milling on a standard plastic mill. The compounded polymer composition was then evaluated for melt flow according to ASTM D-1238, Condition L.

|  | Melt Flow (grams/10 minutes) |
| --- | --- |
| Product of Example 1 | 6.2 |
| Control | 6.1 |

These results indicate that the dustless compositions of the invention have no deleterious effect on the melt flow characteristics of the polymer.

EXAMPLE 5

Evaluation of Dispersibility in Polypropylene

Unstabilized polypropylene films (5 mils thick), containing either 1 percent by weight of the composition of Example 1 or 1 percent by weight of the untreated nickel n-butylamine complex of 2,2'-thiobis(4-t-octylphenol), were prepared by conventional milling and molding techniques. The films were then evaluated microscopically under polarized light at a magnification of 5 X. Results are shown below.

|  | Particle Size Distribution | |
| --- | --- | --- |
|  | Range | Bulk (80% of particles) |
| Product of Example 1 | 2– 60 μm | 10– 35 μm |
| Control | 10–175 μm | 30–100 μm |

Microscopic examination reveals that the dustless composition of the invention is more readily dispersed in polypropylene than the untreated control sample.

I claim:

1. An essentially dustless, free-flowing light stabilizer composition for polyolefins comprising an intimate mixture of a nickel amine complex of a 2,2'thiobis(4-alkylphenol) and from about 1 to 10 percent by weight thereof of a low molecular weight polyethylene.

2. A composition according to claim 1 wherein said nickel amine complex is the nickel n-butylamine complex of 2,2'-thiobis (4-t-octylphenol).

3. A composition according to claim 2 wherein said low molecular weight poletheylene is present in an amount of about 1 percent by weight.

4. A composition stabilized against the deteriorative effects of ultraviolet radiation comprising a polymer of a mono-olefin and an effective stabilizing amount of the dustless light stabilizer composition of claim 1.

5. A composition according to claim 4 wherein said dustless light stabilizer comprises the nickel n-butylamine complex of 2,2'-thiobis(4-t-octylphenol) and from about 1 to 10 percent by weight thereof of a low molecular weight polyethylene.

6. In the process of incorporating a nickel amine complex of a 2,2'-thiobis(4-alkylphenol) in a polymer of a mono-olefin to stabilize it against the deteriorative effects of ultraviolet radiation, the improvement comprising incorporating said complex in the form of the dustless, free-flowing composition defined in claim 1.

7. A process as defined in claim 6 wherein said complex is the nickel n-butylamine complex of 2,2'-thiobis(4-t-octylphenol).

* * * * *